United States Patent Office 2,733,273
Patented Jan. 31, 1956

2,733,273

PREPARATION OF ASYMMETRICAL BISPHENOLS

Raymond H. Rigterink, Midland, Mich., assignor to The Dow Chemical Company, Midland, Mich., a corporation of Delaware No Drawing. Application March 24, 1952,
Serial No. 278,298

5 Claims. (Cl. 260—619)

The invention relates to an improved method for the preparation of asymmetrical bisphenols.

It is known that asymmetrical halogenated, alkyl bisphenols may be prepared by reacting a halogenated alkyl phenol with a halogenated saligenin-type compound in the presence of an acid condensing agent such as sulphuric acid. Yields of bisphenol obtained from this reaction are quite poor. Furthermore, the reaction is time consuming and impractical for commercial use. The preparation of asymmetrical bisphenols in high yield by a practical and efficient process is much to be desired.

An object of the present invention, then, is to provide a method for the preparation of asymmetrical, halogenated alkyl bisphenols in a practical, efficient manner and in good yield.

According to the invention, asymmetrical halogenated alkyl bisphenols are formed in a two-step process comprising the acetylation of 3,5- or 3,5,6-halogenated saligenin having the general formula:

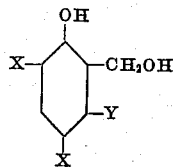

wherein each X is chlorine or bromine and Y is chlorine, bromine or hydrogen, in the presence of a catalytic amount of hydrogen chloride, and the subsequent condensation of the resulting saligenin α-monoacetate, in the presence of an aluminum halide, with an equimolar amount of a compound of the general formula:

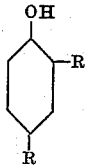

wherein one R is one of the halogens bromine and chlorine, and the other R is an alkyl group of one to four carbon atoms. The resulting bisphenol is separated from the reaction mixture and may be purified according to conventional methods. The product has the general formula:

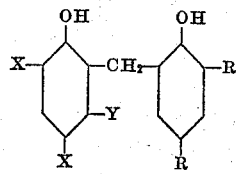

The 3,5- or 3,5,6-halogenated saligenin compound employed in the new reaction is obtained in conventional manner by reacting a 2,4,5-halophenol with formaldehyde or a formaldehyde-producing substance and sodium hydroxide. The halogenated saligenin is recovered by acidification and extraction of the reaction mixture. Examples of halogenated saligenin compounds obtained in this manner and which may be employed in the new process, are: 3,5-dichloro or dibromo saligenin and 3,5,6-trichloro or tribromo-saligenin. The halogenated saligenin is acetylated in an excess of glacial acetic acid and in the presence of a catalytic amount of anhydrous hydrogen chloride. Suitably, about 12 moles of glacial acetic acid and 1 mole of hydrogen chloride is employed for each mole of the halogenated saligenin. Each mole of the saligenin compound reacts with one mole of acetic acid to form one mole of the α-monoacetate of the halogenated saligenin, the excess glacial acetic acid being present to provide a convenient and efficient dehydrating medium for the water that is liberated in the reaction. The anhydrous hydrogen chloride is bubbled through the reaction medium to catalyze the acetylation reaction. The acetylation reaction proceeds satisfactorily at room temperature and is usually complete in about four hours. The α-monoacetate of the halogenated saligenin is crystallized out of the reaction mixture by chilling the latter and diluting with water. The crystals of the monoacetate are subsequently separated and washed with a nonsolvent, e. g., petroleum naphtha.

In the second step of the new process, a mole of an alkyl halophenol is reacted with about a mole of the α-monoacetate of halogenated saligenin in the presence of about an equimolar amount of an aluminum halide and preferably in a halogenated solvent. Specific examples of alkyl halophenols that may be reacted with the monoacetate derivative, are: 4 - chloro - o - cresol; 2 - bromo - p - cresol; 4 - chloro - 2 - ethylphenol; 4-bromo - 2 - propylphenol; 2 - chloro - 4 - isopropylphenol; 4 - bromo - 2 - m - butylphenol; 4 - chloro - 2 - isobutylphenol; and 2 - chloro - 4 - tertiary butylphenol. The amount of the halogenated solvent such as tetrachloroethylene which may be employed as a reaction medium is not critical in the process as only a sufficient amount is necessary to provide a solution medium. The amount of aluminum chloride (AlCl₃) or aluminum bromide (AlBr₃) used is an amount in the order of about 0.5 to 2 moles per mole of the halogenated saligenin α-monoacetate. Temperatures of about 40° to 120° C. and preferably 70° to 100° C. are employed for a period of about 2 hours. Upon completion, the reaction mixture is diluted, cooled and the substituted bisphenol is separated therefrom and subsequently purified.

The invention is illustrated by the following examples, without being limited thereto:

Example 1

987.5 grams (5 moles) of 2,4,5-trichlorophenol was dissolved in a solution of 408 grams (5.1 mole) of 50 per cent sodium hydroxide in one liter of water. 770 grams (10 moles) of about 39 per cent formaldehyde was stirred into the alkaline solution at a temperature below 50° C. A temperature of about 45° to 50° C. was maintained for about 24 hours. The solution was then cooled to about 10° C. and maintained at this temperature during the addition and mixing of 432 milliliters of concentrated hydrochloric acid (36%). Thereupon, a reddish-brown oil separated from the acidified solution. About a liter of tetrachloroethylene was used to dissolve the oil and upon cooling 3,5,6-trichlorosaligenin crystallized out. The product was filtered and dried to yield about 87 per cent of the saligenin compound based on the weight of the 2,4,5-trichlorophenol employed.

About 40 grams (1.1 moles) of hydrogen chloride was bubbled slowly into a mixture consisting of 227 grams (1 mole) of 3,5,6-trichlorosaligenin, 735 grams (12.2 moles) of glacial acetic acid and 227.5 milliliters of petroleum naphtha (B. P. 60–70°) over a period of about 4 hours. The mixture was maintained at a temperature of 25° to 30° C. with mechanical stirring. A heavy oil separated out of the mixture upon cooling after adding about a half-liter of water. The oil layer subsequently solidified. This solid product was separated, washed and dried to yield 212 grams or 78.7 per cent of 3,5,6-trichlorosaligenin α-monoacetate.

26.6 grams (0.2 mole) of anhydrous aluminum chloride was added to a solution of 49 grams (0.18 mole) of 3,5,6-trichlorosaligenin α-monoacetate and 34 grams (0.2 mole) of 4-chloro-2-isopropylphenol in 200 milliliters of tetrachloroethylene, which was maintained with stirring at a tempeerature of 90° to 95° C. for a period of 2 hours. Subsequently 100 milliliters of water and 100 milliliters of concentrated hydrochloric acid were added to the mixture with adequate cooling. After separation of the two resulting layers, the lower organic layer was washed with 200 cc. of water and dried. On cooling the organic layer, the bisphenolic product separated out. This was filtered, washed and dried to yield 57 per cent by weight of 3',4,4',6'-tetrachloro-6-isopropyl-2,2'-methylenediphenol based on the initial 2,4,5-trichlorophenol. The purified bisphenolic product had a melting point of 184° to 187° C.

*Example 2*

4,4',6'-trichloro-6-isopropyl - 2,2' - methylenediphenol was prepared in a similar manner as in Example 1. 99 grams of 3,5-dichlorosaligenin α-monoacetate was first prepared by reacting 96.5 grams (0.5 mole) of 3,5-dichlorosaligenin with 350 milliliters of glacial acetic acid in 100 milliliters of naphtha (B. P. 86–100° C.). About 74 grams (0.32 mole) of the 3,5-dichlorosaligenin α-monoacetate was then reacted with about 81 grams (0.47 mole) of 4-chloro-2-isopropylphenol and 46 grams (0.35 mole) of anhydrous aluminum chloride in 250 milliliters of tetrachloroethylene. A yield of about 66 per cent by weight of 4,4',6'-trichloro-6-isopropyl-2,2'-methylenediphenol based on 3,5-dichlorosaligenin was obtained. The purified bisphenolic product had a melting point of 125° to 127° C.

*Example 3*

4-tertiarybutyl-3',4',6,6'-tetrachloro - 2,2' - methylenediphenol was similarly prepared from 54 grams (0.2 mole) of 3,5,6-trichlorosaligenin α-monoacetate and 46.2 grams (0.25 mole) of 4-tertiarybutyl-2-chlorophenol in 100 milliliters of tetrachloroethylene and catalyzed with 29.3 grams (0.22 mole) of anhydrous aluminum chloride. A product yield of about 76 per cent by weight based on the charged saligenin α-monoacetate was obtained. The purified bisphenolic product had a melting point of 140° to 142° C.

*Example 4*

3',4,4',6' - tetrachloro-6-methyl-2,2'-methylenediphenol was prepared in a similar manner from 134.8 grams (0.5 mole) of 3,5,6-trichlorosaligenin α-monoacetate and 85.6 grams (0.6 mole) of 4-chloro-o-cresol in 250 milliliters of tetrachloroethylene and catalyzed with 73.3 grams (0.55 mole) of anhydrous aluminum chloride. A product yield of about 92 per cent by weight based on the charged saligenin α-monoacetate was obtained. The purified bisphenolic product had a melting point of 198° to 199° C.

In a similar manner, the other 2- or 4-alkyl halobisphenols may be prepared. The process of the present invention proceeds smoothly and efficiently to give a much better yield of the desired asymmetrical bisphenolic product than is obtainable by prior processes. The various examples have dealt with chloro compounds. It has been found that corresponding brominated bisphenols may be prepared in the same way.

I claim:

1. Process for preparing asymmetrical halogenated alkyl bisphenols comprising the steps of acetylating a compound of the general formula:

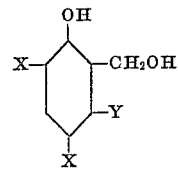

wherein the substituents X are one of the halogens chlorine and bromine and Y is selected from the group consisting of the same halogen and hydrogen, in the presence of a catalytic amount of hydrogen chloride, condensing the α-monoacetate of the halogenated saligenin in the presence of about an equimolar amount of an aluminum halide with an equimolar quantity of a compound of the general formula:

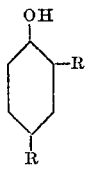

wherein one R is one of the halogens bromine and chlorine, and the other R is an alkyl group of one to four carbon atoms, and subsequently separating the bisphenolic product having the general formula:

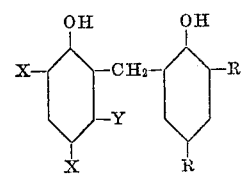

2. Process for preparing 3',4,4',6'-tetrachloro-6-isopropyl-2,2'-methylenediphenol comprising the steps of acetylating 3,5,6-trichlorosaligenin in the presence of a catalytic amount of hydrogen chloride with an excess of glacial acetic acid, condensing the α-monoacetate of the halogenated saligenin in the presence of an equimolar amount of aluminum chloride with an equimolar amount of 4-chloro-2-isopropylphenol in an inert solvent medium, and subsequently separating the bisphenolic product.

3. Process for preparing 4,4',6'-trichloro-6-isopropyl-2,2'-methylenediphenol comprising the steps of acetylating 3,5-dichlorosaligenin in the presence of a catalytic amount of hydrogen chloride with an excess of glacial acetic acid, condensing the α-monoacetate of the halogenated saligenin in the presence of an equimolar amount of aluminum chloride with an equimolar amount of 4-chloro-2-isopropylphenol in an inert solvent medium, and subsequently separating the bisphenolic product.

4. Process for preparing 4-tertiarybutyl-3',4',6,6'-tetrachloro-2,2'-methylenediphenol comprising the steps of acetylating 3,5,6-trichlorosaligenin in the presence of a catalytic amount of hydrogen chloride with an excess of glacial acetic acid, condensing the α-monoacetate of the halogenated saligenin in the presence of an equimolar amount of aluminum chloride with an equimolar amount of 4-tertiarybutyl-2-chlorophenol in an inert solvent medium, and subsequently separating the bisphenolic product.

5. Process for preparing 3',4,4',6'-tetrachloro-6-methyl-2,2'-methylenediphenol comprising the steps of acetylating 3,5,6-trichlorosaligenin in the presence of a catalytic amount of hydrogen chloride with an excess of glacial acetic acid, condensing the α-monoacetate of the halogenated saligenin in the presence of an equimolar amount of aluminum chloride with an equimolar amount of 4-chloro-o-cresol in an inert solvent medium, and subsequently separating the bisphenolic product.

References Cited in the file of this patent

UNITED STATES PATENTS 1,880,566   Weiler et al. _____ Oct. 4, 1932

OTHER REFERENCES

Auwers: Annalen der Chemie, vol. 356 (1907), pgs. 124–151.

Barthel: J. Prakt. Chemie, vol. 161 (1942) pgs. 77–80. (Abstracted in Chem. Abstracts, vol. 37, col. 5041 (1943).)